(No Model.) 2 Sheets—Sheet 1.

E. B. MEYROWITZ.
PERIMETER.

No. 495,506. Patented Apr. 18, 1893.

(No Model.) 2 Sheets—Sheet 2.

E. B. MEYROWITZ.
PERIMETER.

No. 495,506. Patented Apr. 18, 1893.

Witnesses:
J. M. Fowler Jr.
Geo. W. Whitney

Inventor:
Emil B. Meyrowitz
By _____
Attorney.

UNITED STATES PATENT OFFICE.

EMIL B. MEYROWITZ, OF RIDGEFIELD, NEW JERSEY.

PERIMETER.

SPECIFICATION forming part of Letters Patent No. 495,506, dated April 18, 1893.

Application filed September 29, 1892. Serial No. 447,225. (No model.)

*To all whom it may concern:*

Be it known that I, EMIL B. MEYROWITZ, a citizen of the United States, and a resident of Ridgefield, in the State of New Jersey, doing business at No. 104 East Twenty-third street, New York city, New York, have invented a new and useful Improvement in Perimeters, of which the following is a specification.

This invention relates to those instruments used by oculists for measuring the field of vision, and known as perimeters.

The improved perimeter combines in a light and well-balanced instrument the broad arc of one hundred and eighty degrees with two sliding object-carriers of the Landolt perimeter, the "registering" or recording attachment of the Priestley Smith perimeter, and certain novel features peculiar to the improved instrument itself.

The distinctive object of the invention is to facilitate immediately making an absolutely accurate record upon a detachable chart of measurements taken simultaneously at opposite eccentric limits, so as to reduce the danger of mistakes in mapping the field of vision.

Two sheets of drawings accompany this specification as part thereof.

Figure 1:
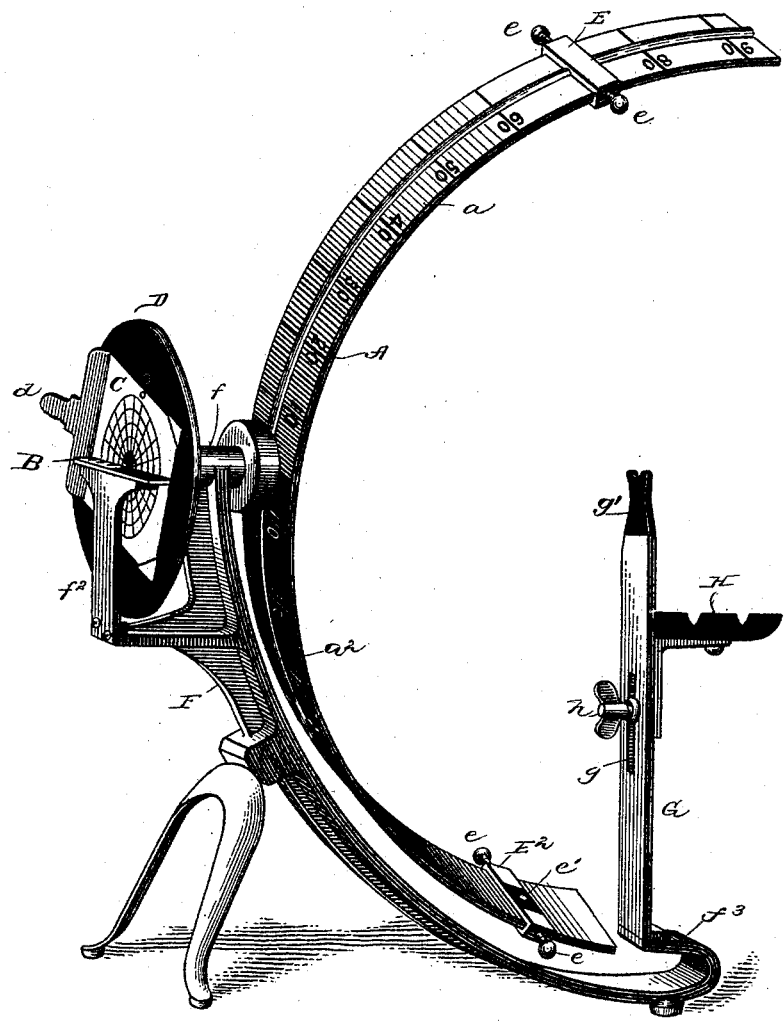
Figure 2:
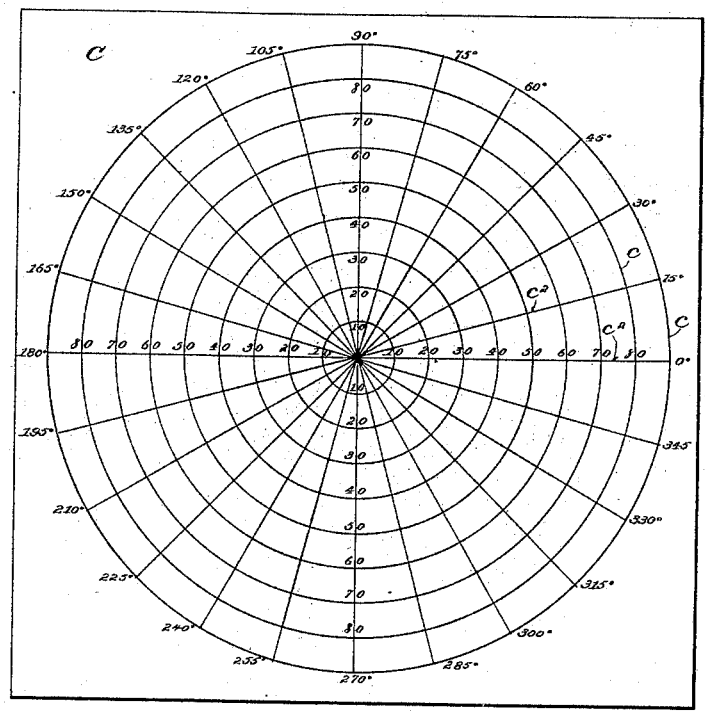

Figure 1 of the drawings is a perspective view of the improved perimeter. Fig. 2 is a face view of a blank chart, detached; and Fig. 3 is a top view of the recording scale, detached.

Like reference letters indicate corresponding parts.

The arc A of the improved perimeter is preferably of hard rubber, has an extent of one hundred and eighty degrees as aforesaid, and is graduated on its outer surface with "90°" at each extremity so that each limb has a scale of ninety degrees on its back; and the two scales, $a$, $a^2$, or their graduations, are of contrasting colors, so as to be easily distinguished by color or by appearance. In the drawings the scale $a$ is conveniently white with black graduating lines and marks, and the scale $a^2$ is black with white graduations.

Figure 3:
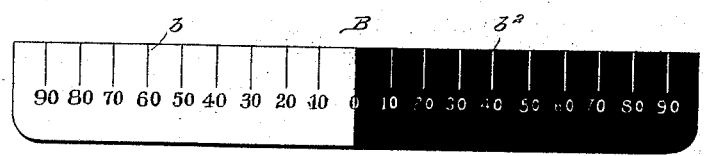

The recording scale B, which is shown detached by Fig. 3 and is preferably of ivory, is correspondingly "bi-colored" and graduated on its top, with its respective ends $b$ $b^2$ alike or corresponding in color with the respective scales of the arc.

The charts C are of suitable paper, simply printed with concentric circles $c$ and radial lines or diameters $c^2$, which are appropriately designated by degree marks as in Fig. 2; the circles corresponding with the graduations on the scale B, and these in turn with those on the arc A, while the diameters, registering with the top of the scale B, indicate the angular position of the arc up to three hundred and sixty degrees or the completion of its revolution.

A disk D, preferably of hard-rubber, carried by the rear end of the spindle of the arc A so as to move therewith, is provided with a spring clip $d$, and with a pair of corner-pockets opposed thereto, for holding a chart C, and is further provided with a gage mark "0" in the plane of the arc so that the 0° diameter of the chart is readily located in said plane. When the arc is horizontal, or at zero, said 0° diameter of the chart coincides also with the top of the scale B.

Two sliding object-carriers E E², Fig. 1, are carried by the respective limbs of the arc A, and each is provided with a pair of knobs $e$ to facilitate moving them. The object on each slide is preferably the customary white spot $e'$ on a dark surface.

A light metallic frame F comprises a horizontal sleeve-bearing $f$ at top, for the spindle common to the arc A and disk D, a rigid bracket $f^2$ behind the same to support the scale B, and an upturned front end $f^3$ which projects in front of the arc. An upright bar G, supported on said upturned end $f^3$, carries at its upper end a hard rubber tip $g'$, determining the point of fixation, and is provided with a vertical slot $g$; and a double chin-rest H, sliding on said bar, is fastened in correct position by a thumb-screw $h$, working in said slot.

The chin-rest H having been adjusted as to height to suit a person whose eyes are to be mapped as to field of vision, and a blank chart C adjusted upon the disk D as above, the operation is proceeded with by turning or revolving the arc A on the axis of its spindle, adjusting the object-carriers E E² on its respective limbs, and recording the eccentric limits so determined.

In making the record with the improved perimeter it is only necessary to note the positions of the respective object-carriers on the bi-colored arc A, and to prick the chart in line with the bi-colored scale B at those graduations on the latter which correspond both as to color and degree-mark with those to be recorded. Thus the object-carrier E being at seventy degrees on the white end of the arc, (referring to the colors shown in the drawings,) and $E^2$ at eighty degrees on its black end, it is only necessary to press the point of the needle or pencil against the chart C immediately above the scale B at seventy degrees on the white end of the latter, and at eighty degrees on its black end, to record at once both limits of eccentricity, and the angular line in which the measurements were made. When one eye is fully mapped, another blank chart is substituted for the filled one, the other notch of the chin-rest is used, and the measurements of the other eye are determined and recorded in like manner.

The arc A and other parts of the improved perimeter may be made of different materials from those hereinbefore suggested, the contrasting colors may be white and red, red and green, or any preferred combination, and other like modifications will suggest themselves to those skilled in the art.

In practice, the arc A being of black rubber, its respective scales $a\,a^2$ have been formed or provided the one with red and the other with white graduating lines and marks; the end $b$ of the white ivory scale B has been graduated in red so as to correspond in this respect with said scale $a$, being known as the red end; and the end $b^2$ of said scale B has been graduated with black lines and marks so as to be black and white and thus to correspond with said scale $a^2$ of the arc, being known as the white end.

Having thus described the said improvement, I claim as my invention and desire to patent under this specification—

1. An improved perimeter having a bi-colored arc, a chart-holder moving with said arc, and a bi-colored fixed scale in front of which the chart is supported by said chart-holder, substantially as hereinbefore specified.

2. The combination, in a perimeter, of an arc of one hundred and eighty degrees the respective limbs of which have graduated surfaces of different colors, a fixed recording scale having its respective ends graduated and colored to correspond with the respective limbs of the arc, a chart-holding disk fast on the spindle of the arc, in front of said scale, and a pair of sliding object-carriers on the respective limbs of the arc, substantially as hereinbefore specified.

E. B. MEYROWITZ.

Witnesses:
ITMES BRANDON,
H. R. SCHWEINLER.